United States Patent
Casillas et al.

(10) Patent No.: US 11,609,796 B2
(45) Date of Patent: Mar. 21, 2023

(54) DYNAMIC CAPACITY OPTIMIZATION FOR SHARED COMPUTING RESOURCES SEGMENTED INTO RESERVATION ZONES

(71) Applicant: Google LLC, Mountain View, CA (US)

(72) Inventors: Jose Casillas, Mountain View, CA (US); Ozan Demir, Kirkland, WA (US); Brent Welch, Mountain View, CA (US); Mikhail Basilyan, Seattle, WA (US); Roy Peterkofsky, Seattle, WA (US); Timothy Smith, Seattle, WA (US); Philipp Keller, Mountain View, CA (US)

(73) Assignee: Google LLC, Mountain View, CA (US)

( * ) Notice: Subject to any disclaimer, the term of this patent is extended or adjusted under 35 U.S.C. 154(b) by 133 days.

(21) Appl. No.: 16/464,372

(22) PCT Filed: Dec. 14, 2017

(86) PCT No.: PCT/US2017/066426
§ 371 (c)(1),
(2) Date: May 28, 2019

(87) PCT Pub. No.: WO2019/117921
PCT Pub. Date: Jun. 20, 2019

(65) Prior Publication Data
US 2020/0334088 A1    Oct. 22, 2020

(51) Int. Cl.
*G06F 9/50*          (2006.01)

(52) U.S. Cl.
CPC .......... *G06F 9/5077* (2013.01); *G06F 9/5072* (2013.01); *G06F 2209/504* (2013.01);
(Continued)

(58) Field of Classification Search
CPC .............. G06F 9/5077; G06F 9/5072; G06F 2209/5014; G06F 2209/5021; G06F 2209/504; Y02D 10/00
See application file for complete search history.

(56) References Cited

U.S. PATENT DOCUMENTS 8,856,341 B2    10/2014   Heumesser et al.
9,094,415 B2    7/2015    Olsen et al.
(Continued)

FOREIGN PATENT DOCUMENTS

WO    WO 2017010922    1/2017

OTHER PUBLICATIONS

Koutras et al. Optimal server resource reservation policies for priority classes of users under cyclic non-homogeneous markov modeling Oct. 16, 2009 [retrieved on Apr. 28, 2022] Retrieved from <URL:https://www.sciencedirect.com/science/article/pii/S0377221708007674>, pp. 1-12 (Year: 2009).*

(Continued)

*Primary Examiner* — Meng Ai T An
*Assistant Examiner* — Hsing Chun Lin
(74) *Attorney, Agent, or Firm* — Honigman LLP; Brett A. Krueger

(57) ABSTRACT

Systems, methods, devices, and other techniques for managing a computing resource shared by a set of online entities. A system can receive a request from a first online entity to reserve capacity of the computing resource. The system determines a relative priority of the first online entity and identifies a reservation zone that corresponds to the relative priority of the first online entity. The system determines whether to satisfy the request based on comparing (i) an amount of the requested capacity of the computing resource and (ii) an amount of the portion of unused capacity of the computing resource designated by the reservation zone that (Continued)

online entities having relative priorities at or below the relative priority of the first online entity are permitted to reserve.

20 Claims, 6 Drawing Sheets

(52) U.S. Cl.
CPC ............... *G06F 2209/5014* (2013.01); *G06F 2209/5021* (2013.01)

(56) References Cited

U.S. PATENT DOCUMENTS

| | | | |
|---|---|---|---|
| 9,755,990 B2 | 9/2017 | Vicaire | |
| 10,366,358 B1* | 7/2019 | Roth | G06F 9/505 |
| 10,686,677 B1* | 6/2020 | Ward, Jr. | H04L 41/0896 |
| 2005/0157644 A1* | 7/2005 | Johansson | H04L 67/322 |
| | | | 370/229 |
| 2006/0165224 A1* | 7/2006 | Lee | H04L 41/0896 |
| | | | 379/16 |
| 2006/0190482 A1 | 8/2006 | Kishan et al. | |
| 2009/0116434 A1* | 5/2009 | Lohr | H04L 5/0007 |
| | | | 370/329 |
| 2011/0106934 A1* | 5/2011 | Sadasivan | H04L 41/0893 |
| | | | 709/223 |
| 2013/0311650 A1 | 11/2013 | Bandwine et al. | |
| 2017/0310609 A1* | 10/2017 | Kim | H04L 41/06 |

OTHER PUBLICATIONS

PCT Search Report and Written Opinion in International Application No. PCT/US2017/066426, dated Sep. 21, 2018, 15 pages.

\* cited by examiner

DYNAMIC CAPACITY OPTIMIZATION FOR SHARED COMPUTING RESOURCES SEGMENTED INTO RESERVATION ZONES

CROSS-REFERENCE TO RELATED APPLICATION

This application is a National Stage Application under 35 U.S.C. § 371 and claims the benefit of International Application No. PCT/US2017/066426, filed Dec. 14, 2017. The disclosure of the foregoing application is hereby incorporated by reference in its entirety.

BACKGROUND

Cloud computing platforms provide online entities with access to shared computing resources. A cloud platform can include a collection of computers that provide shared computing resources and services to customers (sometimes referred to as "tenants" of the cloud platform), or to online entities more generally, often over the Internet. For example, the cloud platform may provide pools of network, storage, hardware, and other computing resources that allow entities to develop and execute online applications at scale, without need for the entities to maintain their own sophisticated information technology (IT) infrastructures.

In some cases, cloud platforms are configured to allocate capacity of shared resources to individual online entities. For example, an organization may request to run an application on the cloud platform, and the platform may allocate sufficient capacity to instantiate a virtual machine that can run the application as a guest program on the platform. Although large cloud platforms may have vast amounts of resources that can be shared among many tenants, in reality, the capacity of resources are finite. Tenants are sometimes assigned quotas that limit how much capacity they may consume. The quotas may be static, in that they are fixed, e.g., by policy or by agreements between the cloud provider and the tenants. However, applying such quotas may lead to inefficiencies in the overall use of system capacities in the cloud platform or may lead to the demand beyond the capacity of the cloud platform. For example, an organization (or more than one) may be denied resources beyond their quota even though the cloud platform has excess capacity at a particular time that the organization requires additional resources. In another situation, an organization (or more than one) may wish to use resources within their quota at a particular time but cannot be provided with such resources as the cloud platform has already reached its maximum capacity.

SUMMARY

This specification describes systems, methods, devices, and other techniques for managing allocation of capacity of shared computing resources, such as resources provided to tenants of a cloud computing platform. Rather than issuing the tenants static usage quotas, the techniques described herein instead dynamically determine zones in which tenants can reserve capacity of a shared resource up to an amount that corresponds to a relative priority of the tenant. A 'zone' of a shared resource (also referred to as a 'reservation zone') refers to an amount of unused capacity of the shared resource that is available to tenants or other entities within or below a given priority tier. Thus, higher priority tenants can reserve more capacity than tenants of lower priorities, but the boundaries/sizes of the zones can be dynamically updated based on usage forecasts, projected capacity availability, and other criteria so that a resource is efficiently and more fully utilized across a range of tenants.

Some implementations of the subject matter described herein include a computing system. The system can include one or more computers having memory and at least one data processing apparatus configured to implement: a computing resource that is shared among a set of online entities, the computing resource having a finite capacity for executing activities of the set of online entities; an online entity manager that determines relative priorities of the set of online entities based on prioritization criteria; an optimization engine that determines a set of reservation zones for the set of online entities, each reservation zone designating a portion of unused capacity of the computing resource that online entities having relative priorities at or below a corresponding threshold priority for the reservation zone are permitted to reserve; and a resource manager that manages allocation of the finite capacity of the computing resource to the set of online entities, including determining whether to reserve capacity of the computing resource for an online entity responsive to a request from the online entity based on whether an amount of the requested capacity is less than an amount of the portion of unused capacity of the computing resource that is designated by the corresponding reservation zone for the online entity.

These and other implementations can optionally include one or more of the following features.

The computing resource that is shared among the set of online entities can include at least one of a shared network resource, a shared server resource, a shared storage resource, a shared application resource, or a shared service resource in a cloud-based platform.

The online entity manager can determine the relative priorities of the set of online entities by: assigning a priority score to each of the set of online entities, the priority score representing a measure of significance of the online entity; and classifying the set of online entities into multiple groups of online entities based on the priority scores, wherein each group of online entities is attributed a relative priority that represents a measure of significance of the group of online entities. The relative priorities of the set of online entities can correspond to the relative priorities of the respective groups of online entities to which the set of online entities were assigned.

The optimization engine can determine respective reservation zones for the groups of online entities, and the respective reservation zone for each particular group of online entities, other than the group that is attributed the lowest relative priority, designates a portion of the unused capacity of the computing resource that the particular group is permitted to reserve as including (i) all of the unused capacity of the computing resource that groups that have a lower relative priority than the particular group are permitted to reserve and (ii) an additional portion of the unused capacity of the computing resource.

The online entity manager can determine the priority score that is assigned to each of the set of online entities based on the prioritization criteria, and the prioritization criteria can include at least one of a status of an account of the online entity, a historic frequency of use of the computing resource or other shared computing resources by the online entity, a forecasted frequency of use of the computing resource or other shared computing resources by the online entity, a historic level of use of the computing resource or other shared computing resources by the online entity, a forecasted level of use of the computing resource or other shared computing resources by the online entity, or types of activities initiated by the online entity on the computing resource or other shared computing resources.

The optimization engine can be further configured to determine zone limits that define boundaries between reservation zones in the set of reservation zones based on (i) forecasted levels of use of the computing resource by online entities in the set of online entities and (ii) the relative priorities of the online entities.

The resource manager can be configured, in response to determining that the amount of the requested capacity is less than the amount of the portion of unused capacity of the computing resource that is designated by the corresponding reservation zone for the online entity, to allocate capacity of the computing resource for use by the online entity without intentional delay or making an advance reservation for capacity of the computing resource that is to be allocated for use by the online entity at a future time.

Some implementations of the subject matter described herein include a first computer-implemented method. The method can include receiving, by a computing system that manages a computing resource shared by a set of online entities, a request from a first online entity of the set of online entities to reserve capacity of the computing resource; determining a relative priority of the first online entity with respect to other ones of the set of online entities. A reservation zone can be identified that corresponds to the relative priority of the first online entity, the reservation zone designating a portion of unused capacity of the computing resource that online entities having relative priorities at or below the relative priority of the first online entity are permitted to reserve. The system determines whether to satisfy the request based on comparing (i) an amount of the requested capacity of the computing resource and (ii) an amount of the portion of unused capacity of the computing resource designated by the reservation zone that online entities having relative priorities at or below the relative priority of the first online entity are permitted to reserve. In response to determining that the amount of the requested capacity of the computing resource is less than the amount of the portion of unused capacity of the computing resource designated by the reservation zone that online entities having relative priorities at or below the relative priority of the first online entity are permitted to reserve, the system can reserve capacity of the computing resource for the first online entity in satisfaction of the request.

These and other implementations can optionally include one or more of the following features.

The computing resource that is shared by the set of online entities can include at least one of a shared network resource, a shared server resource, a shared storage resource, a shared application resource, or a shared service resource in a cloud-based platform.

The system can further perform operations of assigning a priority score to each of the set of online entities, the priority score representing a measure of significance of the online entity; and classifying the set of online entities into multiple of groups of online entities based on the priority scores, wherein each group of online entities is attributed a relative priority that represents a measure of significance of the group of online entities. Determining the relative priority of the first online entity with respect to the other ones of the set of online entities can include identifying the relative priority of the group of online entities to which the first online entity belongs.

The priority score for each of the set of online entities be determined based on at least one of a status of an account of the online entity, a historic frequency of use of the computing resource or other shared computing resources by the online entity, a forecasted frequency of use of the computing resource or other shared computing resources by the online entity, a historic level of use of the computing resource or other shared computing resources by the online entity, a forecasted level of use of the computing resource or other shared computing resources by the online entity, or types of activities initiated by the online entity on the computing resource or other shared computing resources.

The portion of the unused capacity of the computing resource that the reservation zone designates as being permissible for online entities having relative priorities at or below the relative priority of the first online entity to reserve can include (i) all of the unused capacity of the computing resource that online entities having relative priorities below the relative priority of the first online entity are permitted to reserve and (ii) an additional portion of the unused capacity of the computing resource.

The system can determine limits for the reservation zone based on (i) forecasted levels of use of the computing resource by online entities in the set of online entities and (ii) the relative priorities of the online entities.

Reserving capacity of the computing resource for the first online entity can include making an advance reservation for capacity of the computing resource that is to be allocated for use by the first online entity at a future time.

Some implementations of the subject matter described herein include a second computer-implemented method. The method can include receiving, by a computing system that manages a computing resource shared by a plurality of entities, an indication that a first entity of the plurality of entities requires access to a first portion of the computing resource for use by the first entity. Each entity of the plurality of entities can have a relative priority with respect to the other entities. The method can further include determining an available capacity of the computing resource; determining a second portion of the computing resource that is allocated to or in use by entities with a higher priority than the first entity; and allocating the first entity the first portion of the computing resource if the first portion is less than or equal to the available capacity of the computing resource minus the determined second portion of the computing resource.

These and other implementations can optionally include one or more of the following features.

Allocating the computing resource can provide exclusive use of the computing resource to the first entity.

The first portion of the computing resource may not be allocated to the first entity if the first portion is greater than the available capacity minus the determined second portion of the computing resource.

The system may allocate a third portion of the computing resource to the first entity rather than the first portion if the first portion is determined to be greater than the available capacity minus the determined second portion of the resource. The third portion can be smaller than the first portion and the third portion can be equal to or less than the available capacity minus the determined second portion.

Determining the second portion of the computing resource can include forecasting the future use of the computing resource by the entities with a higher priority than the first entity.

The steps of the method can be repeated for a second entity requiring access to a second portion of the computing resource.

The indication can be a request from the first entity to use or be allocated the first portion of the computing resource.

As an example of the foregoing techniques, if a customer or entity of value $X_1$ requests to perform an action using $Y_1$ units of resource Z, the system may grant the request if the currently available capacity of resource Z exceeds the high-confidence forecasted usage (or in use capacity) of customers of value $>X_1$ by at least $Y_1$. This procedure may be repeated for all customers, preferably starting with the higher priority customers, until all of the capacity has been allocated. The procedure may also be repeated whenever an entity makes a request for additional computing resources.

The level of priority of a tenant or other entity may be dynamic and based on a relative scale (e.g. a high priority tenant may have greater priority than a low priority tenant with a discrete or a sliding scale of priorities). The level of priority may be based on a set of criteria or weighted criteria. For example, such criteria may include: the time that an entity has been a tenant; the amount of resources consumed within a period; the consistency or variation of the amount of resources used over time; the behavior of the tenant in consuming resources (e.g. how often do they request additional resources or breach or request to change limits or resource allocation); and/or the type of organization that uses the resource (e.g. government, retailer, private individual, manufacturer, service supplier, high value customer, etc.).

The resources provided by the system may be any computing resource, including any one or more of memory, processing power, processing threads, CPU cycles, CPU cores, storage, and communication bandwidth, or a combination of these, for example.

The methods described herein may be implemented as a computer program comprising program instructions to operate a computer including one or more processors. The computer program may be stored on one or more computer-readable media.

Some implementations of the subject matter described herein can, in certain instances, realize one or more of the following advantages. First, by dynamically adjusting the limits of reservation zones based on usage forecasts and tenant priorities, the system may improve utilization of a shared computing resource that is limited in nature. For example, the risk of stockouts may be eliminated or reduced as compared to other approaches for capacity allocation. A stockout occurs when there is no additional capacity of a shared resource that can be allocated to tenants because the entire capacity of the resource is already consumed. Stockouts can occur as a result of overbooking, such as when the total capacity allocated to all tenants exceeds the physical capacity of the resource. Cloud platform providers sometimes overbook capacity on the assumption that not all tenants will simultaneously use their full capacity quota but, at peak times, this assumption may not hold and a stockout may result. In implementations consistent with the techniques described herein, however, the risk of stockouts may be reduced or eliminated by dynamic adjustments of the amounts of reservable capacity of a computing resource for groups of tenants. If current or forecasted usage is high, for example, the system may reduce the reservable capacity made available to the groups of tenants. Alternatively, if current or forecasted usage of the shared resource is relatively low, the system may dynamically increase the reservable capacity made available to groups of tenants. In these instances (increasing reservable capacity when global usage is relatively low), improved utilization of the shared resource may result as tenants are able to reserve and consume greater amounts of capacity than they may have otherwise been permitted with a static usage quota (e.g., when quotas are restrictive despite the fact that a resource may currently be underutilized and unused capacity may currently exist). Thus higher capacity utilization can result because tenants are not prevented from reserving capacity when there is plenty of capacity available. Additionally, in some implementations, the risk of capacity being unavailable for higher-priority tenants may be reduced due to the system expanding reservation zones for higher priority tenants to include capacity that is not made available to lower priority tenants.

In some implementations, the techniques described herein may reduce inefficiencies in a cloud platform as tenants may be provided with (or allocated) resources more effectively and improved prediction or resource availability may be provided to tenants who may then be able to manage their requirements more effectively.

The details of particular implementations are set forth in the drawings and the detailed description below. Additional features and advantages will be apparent to those of ordinary skill in the field to which the subject matter pertains.

DETAILED DESCRIPTION

This specification describes systems, methods, devices, and other techniques for managing allocation of capacity of shared computing resources, such as resources provided to tenants of a cloud computing platform. Details of example implementations of the technology are described with respect to the following figures.

Figure 1:
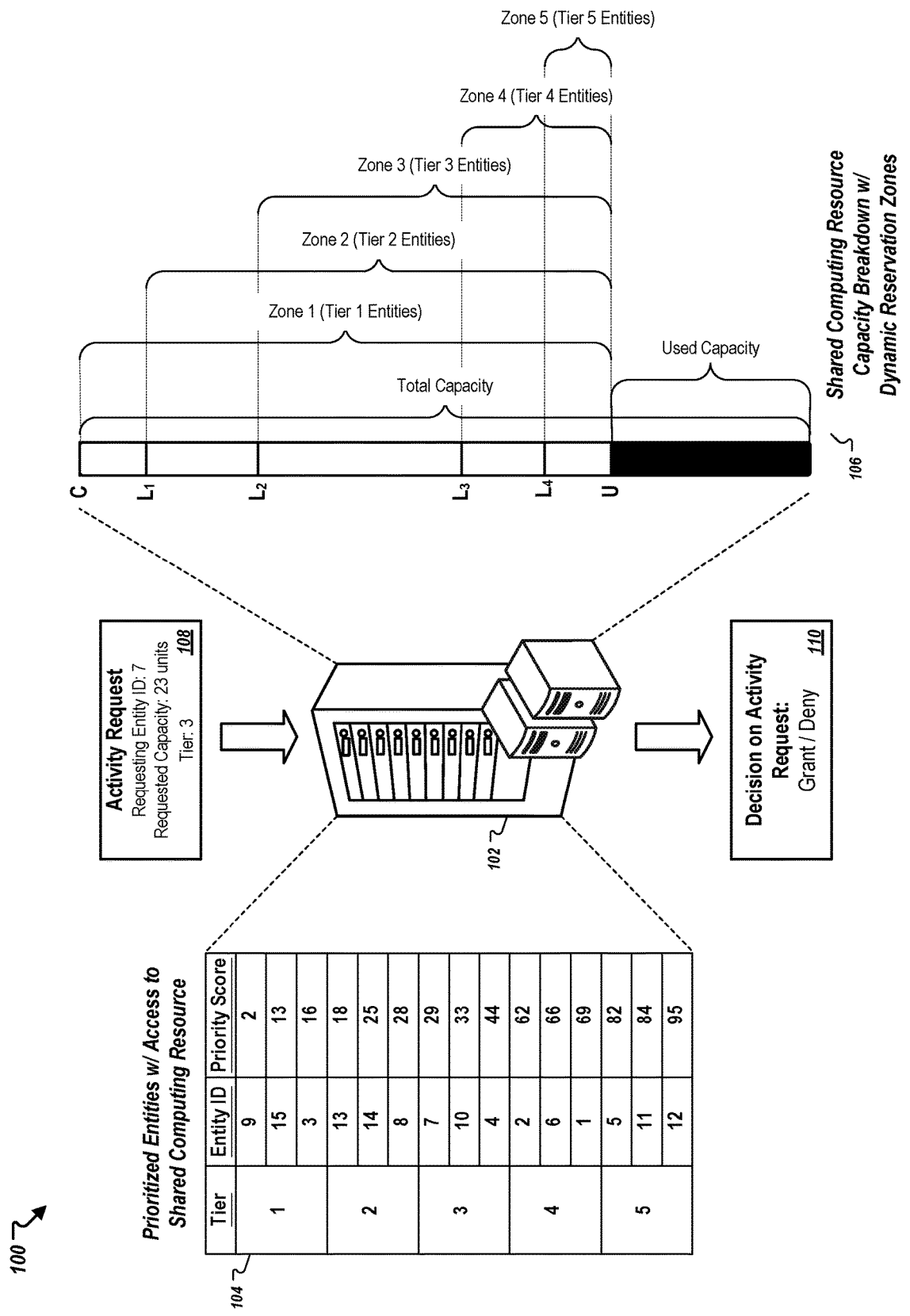
FIG. 1 depicts a conceptual diagram of an environment for managing capacity of a shared computing resource.

Referring to FIG. 1, a conceptual diagram is shown of an environment 100 for managing capacity of a shared computing resource 106. The environment 100 includes a capacity management system 102, a shared resource 106, and a collection of online entities 104 that may access the shared resource 106. In general, the capacity management system 102 is configured to determine and enforce a set of reservation zones for the shared resource 106, which has limited capacity to provide computing services to various different entities. The reservation zones define segments of the unused capacity of the shared resource 106 that different groups of entities 104 are permitted to reserve for either immediate or future use. By monitoring current and forecasted use of capacity of the shared resource 106, the capacity management system 102 may optimize the reservation zones to efficiently utilize the resource's unused capacity, while accounting for differences in the relative priorities of entities 104 that may attempt to reserve any portion of the used capacity of the resource 106. As used throughout this document, the terms optimum, optimize, and variations thereof refer to improving performance of a system through the use of the techniques discussed herein, and does not imply that the performance obtained is necessarily the most optimum performance that is achievable.

The capacity management system 102 can include one or more computers in one or more locations. In some implementations, the system 102 is part of a cloud platform that provisions pools of computing resources for multiple tenants (e.g., online entities 104) and allows the tenants to access the resources over the Internet or other networks from one or more locations. For example, the cloud platform may implement a remote storage service that allows tenants to store files on physical drives owned and/or maintained by an operator of the cloud platform. In this example, the shared resource 106 may be a storage resource having a large, but ultimately finite, storage capacity. As another example, the cloud platform may implement a virtualization service that allows tenants to execute virtual machines on servers owned and/or maintained by the operator of the cloud platform. In this example, the shared resource 106 may represent servers having sufficient computing capacity to execute multiple virtual machines in parallel with each other, but ultimately with a finite computing capacity. In some implementations, the system 102 is provided in a private, onsite server for an organization that makes available capacity for shared resources to members of the organization.

The capacity management system 102 manages access to the shared resource 106. Online entities (e.g., tenants) that wish to utilize the shared resource 106 can issue requests to the capacity management system 102, and the system 102 makes a decision whether to grant or deny the request based on parameters of the request and rules defined by a set of reservation zones for the requested resource 106.

An example of the system 102 acting on a request using reservation zones fora requested resource 106 is illustrated in FIG. 1. In particular, the system 102 receives an activity request 108 from one of the online entities 104. The activity request 108 indicates to the capacity management system 102 that the requesting entity would like to reserve capacity of the shared resource 106. The request 108 can indicate a current need for capacity such that capacity would be immediately allocated to the requesting entity if granted, or the request 108 can indicate a future need for capacity such that an advanced reservation for capacity would be lodged for a specified time in the future if the request were granted.

Requests for capacity can relate to one or more activities that are requested to be executed at least in part using the shared computing resource 106. Activities generally refer to any computing process initiated by an online entity 104 (e.g., cloud tenants who are separate from an operator of the cloud platform) and which process relies in whole or in part on a shared computing resource to carry out the activity. As an example, a requesting entity may request to execute a proprietary application on the physical machines of a cloud platform operator. The entity may request capacity to run the application on the physical machine of the cloud platform operator. If the request is granted, the cloud platform may instantiate a virtual machine on the physical machine and run the requesting entity's application as a guest. A request, such as activity request 108, may or may not expressly indicate the type or specific activity that is to be carried out with the requested capacity. For example, activity request 108 may indicate that a specified amount of capacity is requested for a particular time period without identifying the activity or activities for which the capacity is requested. Alternatively, the activity request 108 may specifically identify the activity or activities for which the capacity is requested. In these instances, the request 108 specifies the requested activity or activities, and the capacity management system 102 may either infer the amount of capacity that would be required to carry out the requested activities or the system 102 may identify the amount of requested capacity from the request 108 itself. In the example of FIG. 1, activity request 108 expressly identifies that the request is for 23 units of capacity of the shared resource 106.

Upon receiving the request 108, the capacity management system 102 determines whether to grant the requested capacity. The determination whether to grant an activity request 108 can be based on both the amount of the requested capacity and the relative priority of the requesting entity. As shown in the table in FIG. 1, the capacity management system 102 can maintain data that indicates the respective priorities of a set of online entities 104. The priorities of the online entities 104 represent a relative significance of the entities 104 with respect to each other. Because capacity of the shared resource 106 is finite, unlimited capacity cannot be granted to all entities 104, and assigning priorities to the entities provides a basis for allocating capacity among the entities in a way that improves utilization of the resource 106.

The priority score assigned to an online entity 104 can be based on one or more prioritization criteria. In some implementations, the prioritization criteria are structured to promote entities that execute activities on the shared resource 106 that complement activities executed by other entities 104, thereby improving global performance of the shared resource 106. For example, a first entity that executes an activity on the shared resource 106 that does not compete for sub-resources (e.g., peripherals, processing cores, or the like) of the resource 106 with activities from other entities 104 may be assigned a higher priority score than a second entity that executes an activity on the shared resource 106 that does compete for the same sub-resources as the activities of other entities 104 concurrently executing on the resource 106. Thus, prioritizing entities in this manner can lead to better technical utilization of the shared resource 106.

In some implementations, the priority score for an entity 104 can be based on other or additional factors such as how frequently the entity 104 has used the resource 106 and/or other shared resources during a past period of time, how frequently the entity 104 is forecasted to use the resource 106 and/or other shared resources during a future period of time, a historic level of use (e.g., an amount of capacity consumed) by the entity 104 of the resource 106 and/or other shared resources during a past period of time, a forecasted level of use by the entity 104 of the resource 106 and/or other shared resources during a future period of time, types of activities initiated by the online entity 104 on the resource and/or other shared computing resources, an account status of the online entity 104 (e.g., representing contractual obligations between the entity 104 and an operator of the shared resource 106), a size of an account of the entity 104 with the operator of the shared resource 106 (e.g., a cloud platform operator), a risk assessment of the entity 104, an estimated value of the entity 104 to the operator of the shared resource 106, or a combination of multiple of these.

In some implementations, the capacity management system 102 classifies the set of online entities 104 into tiers or other groups of entities based on the priority scores. The tier or grouping of an entity 104 can then be used by the system 102 as the relative priority of the entity 104 for the purpose of determining whether to grant or deny the activity request 108. Alternatively, the system 102 can use the priority score itself in addition to or rather than the tier or grouping of the entity 104 as the relative priority of the entity 104 for the purpose of determining whether to grant or deny the activity request 108. Tiers of online entities 104 can be generated by ranking the entities 104 based on the priority scores, determining threshold scores for each tier, and assigning each entity 104 to an appropriate tier based on it score. For example, entity 104 having a priority score of 7 may be assigned to the corresponding tier having thresholds that encompass the priority score of 7. In other implementations, a total number of entities may be prescribed for each tier and entities 104 assigned to the tiers accordingly. For instance, as shown in FIG. 1, each of the tiers 1-5 is assigned three entities 104. Moreover, the tiers represent the relative priorities of the online entities 104 because some tiers have entities with more favorable priority scores than others. Tier 1, as an example, may consist of the highest priority entities whereas tier 5 may consist of the lowest priority entities (in a set of five tiers). The total number of tiers may be adjusted or set at any number, but generally corresponds to the number of reservation zones available for the shared resource 106. For instance, the system 102 may classify the entities into five tiers for five available reservation zones, but may increase the number of tiers if more granular reservation zones are determined or decrease the number of tiers if fewer and broader reservation zones are determined.

The vertical bar at the right of FIG. 1 is segmented to represent different portions of the capacity of the shared resource 106. As shown, the total capacity of the resource 106 is represented by C. The total capacity C may be a true capacity limitation of the resource 106 that, for example, is constrained entirely or primarily by a physical size of the system that implements the shared resource 102 (e.g., physical storage limitations, maximum processing speeds, number of servers or processing cores). However, in other implementations, the total capacity C may be artificially depressed from a physical limitation of the resource 106. For instance, an administrator of the shared resource 106 may dedicate a portion of the underlying system's capacity to maintenance routines or private activities while the remaining portion of capacity is dedicated for the purpose of sharing with online entities 104. Here, then, C may represent a virtual capacity for the portion of physical capacity that is dedicated to the public use of sharing with online entities 104. In yet other implementations, the total capacity C may represent reservable capacity that actually excides the true/ physical capacity of the system that provides the shared resource 102. The system may, for example, increase C beyond the true/physical capacity to allow for "overbooking", on the assumption that there will rarely be an occasion where all entities who have reserved or been allocated capacity actually use their entire allotment.

In addition to representing the total capacity C of the resource 106, FIG. 1 also shows the boundary between used capacity of the resource 106 and unused capacity, and the limits of respective reservation zones within the unused capacity of the resource 106. The shaded portion of the capacity of resource 106 represented from the bottom of the bar to the limit U represents current usage of the resource 106. In some implementations, the currently used portion of capacity cannot be consumed by additional activities from any of the entities 104 until the activities currently consuming this capacity are completed or otherwise halted and the capacity is released.

Within the unused portion of capacity (extending from lower limit U to upper limit C), a series of reservation zones are defined. Five reservation zones are shown in FIG. 1, for example. A reservation zone defines a portion of the unused capacity of the resource 106 that particular classes of online entities 104 are permitted to reserve. According to the scheme represented in FIG. 1, each one of the five reservation zones corresponds to a different one of the five tiers of online entities 104. Entities 104 within higher priority tiers are provided more reservable capacity than entities 104 within lower priority tiers. In particular, the reservation zone for a given tier includes all of the reservable capacity of the immediately preceding reservation zone along with an additional portion of reservable capacity that is not available to the tier of online entities 104 corresponding to the immediately preceding reservation zone. For example, the capacity management system 102 permits the lowest priority entities (tier 5) to reserve the range of capacity of the shared resource 106 from U to $L_4$ (reservation zone 5). The next highest priority entities (tier 4) are permitted to reserve the range of capacity from U to $L_3$ (reservation zone 4). The next highest priority entities (tier 3) are permitted to reserve the range of capacity from U to $L_2$ (reservation zone 3). The next highest priority entities (tier 2) are permitted to reserve the range of capacity from U to $L_1$ (reservation zone 2). Lastly, the highest priority entities (tier 1) are permitted to reserve the full range of unused capacity of the resource 106 from U to C (reservation zone 1).

In some implementations, an online entity 104 can reserve capacity of the shared resource 106 to execute one or more activities up to the full extent of the portion of the unused capacity of the resource 106 designated by the reservation zone corresponding to the entity's relative priority. A single tier 1 entity, for example, would be permitted to reserve the entire unused capacity of the resource 106 designated by reservation zone 1 (extending from U to C). Likewise, a single tier 2 entity would be permitted to reserve the entire unused capacity of the resource 106 designated by reservation zone 2 (extending from U to $L_1$). Of course, it is possible that the aggregate of requested capacity exceeds the total amount of unused capacity of the resource 106, in which case the system 102 may take remedial action such as denying a request that would cause reservations to exceed the total capacity of the resource 106, deferring allocation of the requested capacity, or throttling existing reservation to make room for the requested capacity. Nonetheless, the reservation zones are arranged so that higher priority entities 104 are assured not to be blocked out entirely by lower priority entities. The system 102 ensures that higher priority entities 104 are not prevented from executing activities on the shared resource 106 by lower priority entities by enforcing usage quotas against tiers of entities (e.g., rather than against individual entities). For example, the sum of reserved capacity for all entities in tiers 2-5 cannot exceed $L_1$ (thereby leaving the portion of capacity $C-L_1$ exclusively for tier 1 entities), the sum of reserved capacity for all entities in tiers 3-5 cannot exceed $L_2$ (thereby leaving the portion of capacity $C-L_2$ exclusively for tier 1 and 2 entities), and so on. As will be discussed further with respect to FIG. 4, in some implementations additional usage constraints can be prescribed and enforced that limit how much capacity individual entities 104 within a tier are permitted (or enabled) to reserve (e.g. to leave some capacity for other entities in the same tier), and additionally individual entities 104 may prescribe their own usage constraints (e.g., to prevent any one activity of an entity from consuming the entire allotment of that entity's capacity).

Given the parameters of the activity request 108, the prioritization of online entities 104, and the reservation zone limits for the unused capacity of resource 106, the capacity management system 102 can determine whether to grant or deny the request 106. The system 102 compares the amount of capacity requested to be reserved (whether the request is to reserve capacity that would be immediately allocated or reserved for a future time) with the amount of reservable capacity of the resource 106 defined by the reservation zone that corresponds to the requesting entity's relative priority (e.g., the requesting entity's priority tier). If the amount of requested capacity is within (e.g., less than, or less than or equal to) the amount of reservable capacity of the resource 106 as defined by the corresponding reservation zone, the system 102 can grant the request and reserve capacity accordingly. However, if the amount of requested capacity is outside of (e.g., greater than, or greater than or equal to) the amount of reservable capacity of the resource 106 as defined by the corresponding reservation zone, the system 102 denies the request and takes action such as refusing to reserve the requested capacity, prompting an agent of the requesting entity whether to reserve less than the requested amount of capacity so as to comply with the reservation zone limits, or prompting the requesting entity to increase a bid that would raise the relative priority of the requesting entity and allow the request to be granted.

Figure 2:
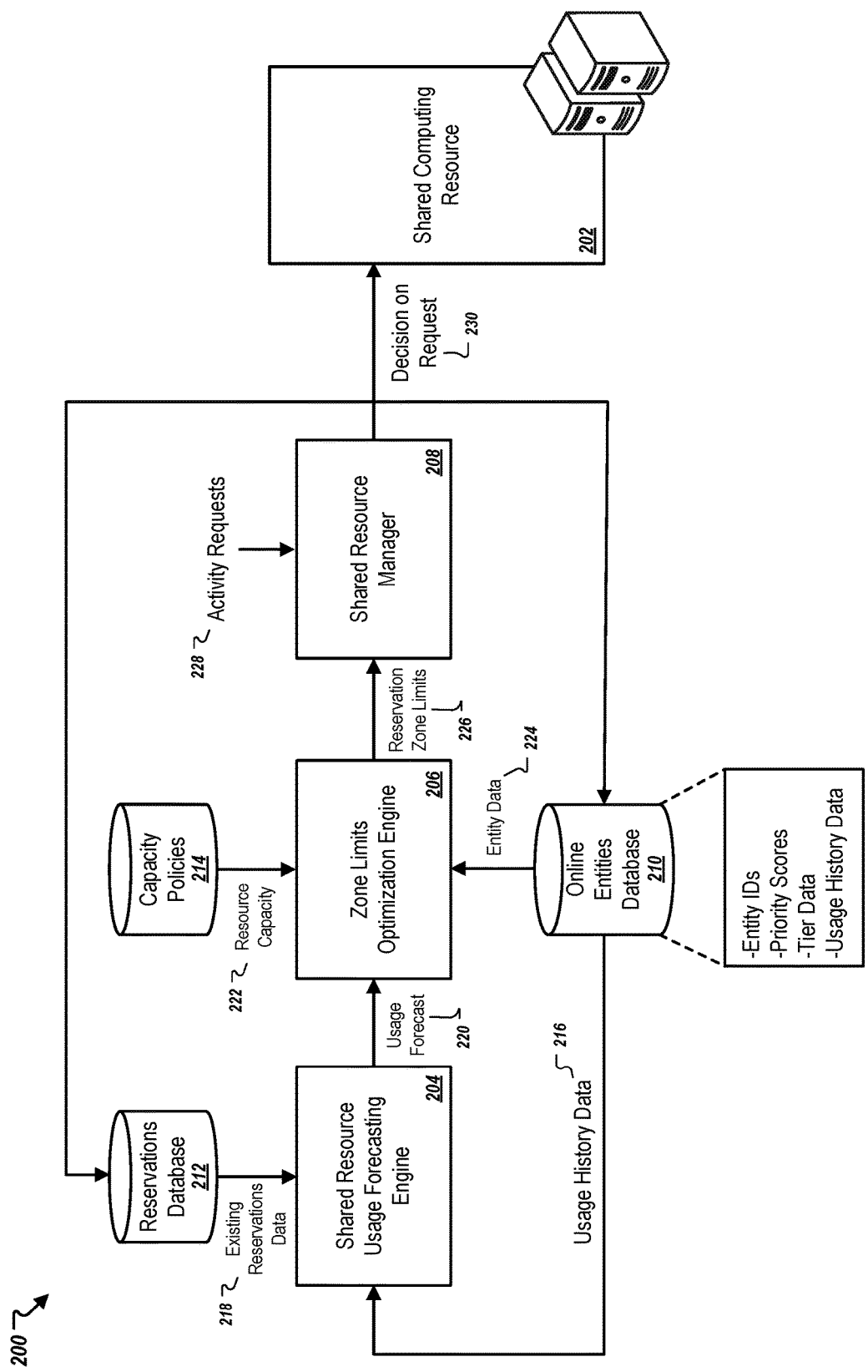
FIG. 2 depicts a block diagram of an example system for optimizing reservation zone limits and enforcing the limits for prioritized tiers of online entities.

FIG. 2 is a block diagram of an example system 200 for defining reservation zone limits and enforcing the limits for prioritized tiers of online entities. The system 200 can include one or more computers in one or more locations. In some implementations, the system 200 is a capacity management system, such as capacity management system 102 (depicted in FIG. 1). In particular, the system 200 may dynamically adjust reservation zone limits to optimize utilization of shared computing resource 202, maximize value of the utilization to the operator of the resource 202 (e.g., a cloud platform operator), provide suitable allocations of reservable capacity to tiers of online entities, or a combination of these. These techniques can, in some implementations, improve performance of the shared computing resource 202 by reducing the risk of stockouts, and allowing greater utilization of the resource 202 by any online entity so long as the forecasted usage by other entities is relatively small.

The system 200 includes a variety of components including a shared computing resource 202, a shared resource usage forecasting engine 204, a zone limits optimization engine 206, a shared resource manager 208, an online entities database 210, a reservations database 212, and a capacity policies database 214. These various components 202-214 of the system 200 may be implemented on a single computer or on multiple computers, such as at a data center or computers in one or more locations. Although the functionality of each of the components is described in example implementations herein, other divisions of functionality among components of the system 200 may also be suitable. Some implementations of the subject matter may include less than all of the components shown in system 200, or may include additional components not sown in FIG. 2. As used herein, a "database" generally refers to any structured representation of data suitable to store and make accessible the data described herein, such as but not limited to a relational database, a non-relational database, a key-value database, a centralized database, a distributed database, or others. The terms "engine" and "manager" refer to components of a computing system that can be implemented based on hardware alone or a combination of hardware and software (e.g., one or more computer processors executing instructions that enable the functionality described herein).

The shared resource usage forecasting engine 204 is configured to forecast levels of capacity of the shared computing resource 202 that individual entities or groups of entities will use over a specified future period of time. In some implementations, the forecasting engine 204 predicts the respective usage of every online entity 104 that is registered to reserve capacity of the shared computing resource 202, or the forecasting engine 204 may directly predict the respective usage of only a subset of registered entities and extrapolate the predictions to similarly situated entities that for which a usage forecast was not directly determined. In some implementations, the forecasting engine 204 predicts the aggregate amount of capacity that will be used by a group of entities, such as by each tier of a set of prioritized entities. The forecasting engine 204 may include a model that predicts future usage based on past usage (indicated by usage history data 216), existing reservations (indicated by existing reservations data 218), or both. For example, for a given online entity, the forecasting engine 204 may access usage history data 216 from an online entities database 210 that stores information about individual entities. The usage history data 216 can indicate information such as how much capacity of the resource 202 the online entity has used at various times in the past, how much capacity the online entity has requested at various times in the past, how much of the entity's requested capacity has been granted or denied in the past, how much the entity's granted/reserved capacity has actually been used during execution of the entity's activities in the past, or a combination of these. Additionally, the forecasting engine 212 can lookup any existing reservations for the online entity in reservations database 212. Based on the existing reservations data 218 and the usage history data 216 for the online entity, the forecasting engine generates usage forecast data 220. The forecast may be generated using a regression model, a machine-learning model (e.g., an artificial neural network), or other suitable techniques. In some implementations, the usage forecast data 220 provides a probability density function that indicates likelihoods (e.g., probabilities) of the online entity using or requesting to use a range of different levels of capacity of the shared computing resource 202.

The zone limits optimization engine 206 is configured to define the limits of the reservations zones for different groups or tiers of online entities. For example, the optimization engine 206 may set the values of $L_1$ through $L_4$ for the reservation zones shown in FIG. 1. In some implementations, the optimization engine 206 sets the boundaries between reservation zones (i.e., the limits of the reservation zones) at points where the probabilistically expected value from an entity's usage of the shared resource 202 in a higher tier equals the actual value that would be derived from an entity's usage of the shared resource 202 in the tier immediately below the higher tier. For example, the optimization engine 206 may set the boundary $L_1$ between reservation zones 1 and 2 at the point where the expected value from a tier 1 entity's usage of the shared resource equals the value from a tier 2 entity's usage of the shared resource 202. Likewise, the optimization engine 206 may set the boundary $L_2$ between reservation zones 2 and 3 at the point where the expected value from a tier 2 entity's usage of the shared resource equals the value from a tier 3 entity's usage of the shared resource 202. The expected value of an entity's usage of the shared resource 202 can be a function of the entity's priority and the probability that the entity will actually use or request to use a given level of capacity of the shared resource 202 (e.g. they may be proportional to each other). The expected value of an entity's usage can be derived from the usage forecast data 220 and entity data 224 that indicates a relative priority (e.g., the priority tier or priority score) of the entity. Thus, in general, when a low-value opportunity presents (e.g. from a lower tier entity), the system may compare the value of that opportunity to the probabilistic expected value of a potential higher-value opportunity arising in the future. The low-value opportunity may be granted if it meets or exceeds the probabilistic expected value of a potential higher-value opportunity arising in the future.

Additionally, the optimization engine 206 accounts for the total capacity of the shared resource as indicated by resource capacity data 222. The total capacity of the resource 202 may be either a true capacity of the resource that is limited by physical constraints of the resource 202, or may be less than the true capacity, e.g., due to the system's reservation of some capacity for private, non-shareable purposes (e.g., maintenance and diagnostic routines). Whether the resource 202 had made the full true capacity available, or a lesser amount, can be specified in a database of capacity policies 214. The optimization engine 206 uses the total capacity of the shared resource 202 as an upper limit of capacity in determining the boundaries of reservation zones.

In some implementations, the optimization engine 206 is configured to determine the reservation zone limits with respect to groups of online entities. For example, the engine 206 may average the usage forecasts 220 for all the entities in a given tier to generate an averaged usage forecast, and may average the priority scores for all the entities in a given tier to generate an averaged priority score for the tier. The engine 206 may then assess the level of capacity at which the expected value of usage from the group of entities in a higher tier equals the expected value of usage from the group of entities in the next lower tier, and may designate that point as the boundary between the corresponding reservation zones for these tiers. The optimization engine 206 can generate reservation zone limits data 226 that indicates, for each reservation zone, the total amount of reservable capacity for the zone or the marginal amount of reservable capacity that is in addition to the reservable capacity of all lower-level zones.

In some implementations, the limits of the reservation zones are dynamic. As usage forecasts change, new reservations are made or reservations cancelled, changes occur in the priorities or makeup of online entities, changes in available capacity, or a combination of these and other factors, the boundaries of the reservation zones may be updated to reflect recent conditions. In this way, rather than assessing fixed usage quotas to individual entities or groups of entities, the system 200 may be responsive to changing conditions and can update the reservation zone limits to account for changed conditions. For example, forecasting engine 204 may have initially predicted that tier 1 entities would require using a large amount of capacity during a future period of time. However, as that time approaches and tier 1 entities do not reserve as much capacity as initially predicted, the zone limits may be updated to allocate more reservable capacity for lower tier entities. As such, additional entities may have the opportunity to reserve capacity, thus increasing the likelihood of full utilization of the shared resource 202. Reservation zone limits 226 may be updated based on any suitable triggering event. In some implementations, the limits 226 may be updated in response to each request for capacity (e.g., an activity request) from an entity. In some implementations, the limits are updated on a predefined periodic basis (e.g., once every minute, hour, day, or week). In some implementations, the limits are updated upon detecting certain conditions such as a threshold excess in activity requests or requested capacity, or a threshold deficit in activity requests or requested capacity.

The shared resource manager 208 is configured to process activity requests 228 from online entities and to make decisions 230 on the requests 228 to either grant or deny capacity of the shared computing resource 202. In some implementations, the shared resource manager 308 determines whether to grant capacity for an activity request 228 based on whether the amount of requested capacity is within the amount of unused capacity of the shared computing resource 202 designated for the reservation zone that corresponds to the relative priority of the requesting entity. Additional detail of operations performed by the shared resource manager 208 are described, for example, with respect to FIG. 3.

Figure 3:
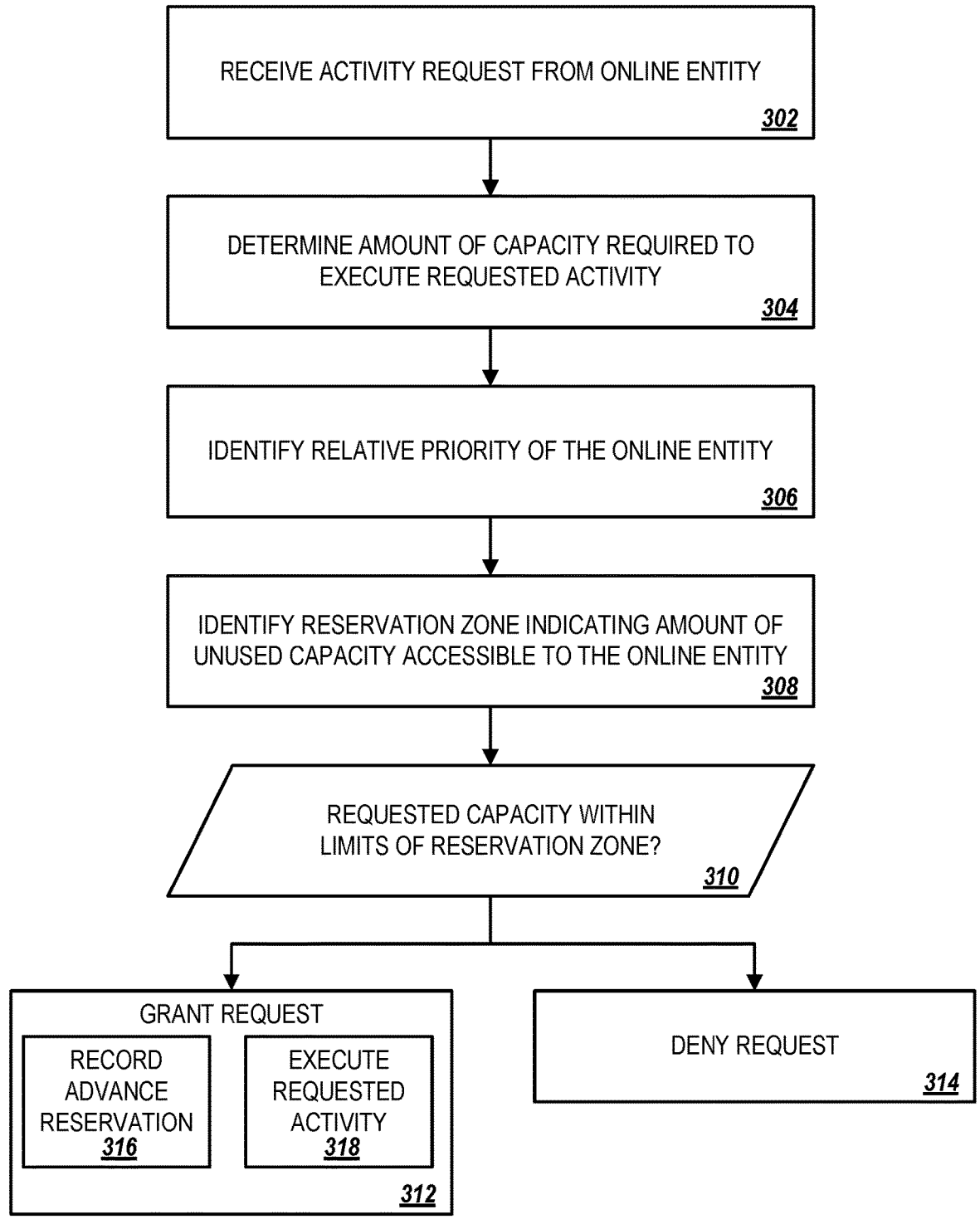
FIG. 3 depicts a flowchart of an example process for reserving or denying capacity of a shared computing resource based on an activity request.

FIG. 3 is a flowchart of an example process 300 for reserving or denying capacity of a shared computing resource in response to a request for capacity from an online entity. In some implementations, the process 300 is performed by a shared resource manager of a capacity management computing system, such as the shared resource manager 208 depicted in FIG. 2.

At stage 302, the shared resource manager receives an activity request from an online entity. An activity request can be issued by an online entity to reserve capacity of a shared computing resource for one or more activities. An activity can be any computing process that relies in whole or in part on a shared computing resource to carry out the activity. For example, an online entity may request to execute a proprietary application on the physical machines of a cloud platform. The entity may request capacity for the activity as needed for the application to run on the platform. If the request is granted, a virtual machine can be instantiated on the physical machine of the cloud platform operator which runs the requesting entity's application as a guest on the virtual machine. Even though an activity request is typically tied to one or more activities that are requested to be carried out, the request itself may or may not expressly identify the activity. For example, an activity request may request a specific amount of capacity to reserve at a particular time without actually naming the activity or activities for which the capacity is requested. Alternatively, the activity request may expressly identify the activity or activities for which the capacity is requested. In these instances, the request identifies the requested activity or activities, and the shared resource manager may either infer the amount of capacity that would be required to carry out the requested activities or the system may identify the amount of requested capacity from the request itself.

At stage 304, the shared resource manager determines the amount of requested capacity that would satisfy the activity request. In some implementations, the activity request specifies the amount of requested capacity, in which case the shared resource manager parses the request and identifies the amount of requested capacity from the request itself. In some implementations, the request identifies one or more activities, but does not expressly indicate how much capacity of the shared computing resource would be required to carry out the requests. In such cases, the shared resource manager may indirectly determine the amount of capacity required to carry out the requested activities. For example, the shared resource manager can access data that correlates activities of online entities with expected amounts of capacity required for the activities, and can use this value or a value derived from the expected amount as the amount of requested capacity for the request. The data that correlates activities with expected amounts of capacity required for the activities can be determined based on past instances of online entities executing the activities and how much capacity was used in those instances.

At stage 306, the shared resource manager identifies the relative priority of the requesting entity. In some implementations, the relative priority is indicated by the entity's priority score. In other implementations, the relative priority is indicated by the particular tier or group of entities to which the entity has been assigned. The priority of a requesting entity can indicate a relative significance of the entity with respect to other online entities that are registered to execute activities using the shared computing resource. In some implementations, assigning priorities to entities provides a basis for allocating finite capacity of the shared computing resource among a set of entities that may use the resource.

At stage 308, the shared resource manager determines the capacity limits of the reservation zone corresponding to the relative priority of the online entity. The limits of the corresponding reservation zone can indicate the maximum amount of reservable capacity of the shared computing resource is available to the online entity that issued the activity request. The size of the reservation zone may be proportional to the relative priority of the requesting entity. For example, a higher tier entity may be permitted to reserve more capacity than a lower tier entity. In some implementations, the shared resource manager determines the limits of the corresponding reservation zone from an optimization engine that dynamically updates the limits of the reservation zones at particular times so as to promote full and efficient utilization of the shared resource by entities across multiple priority tiers.

At stage 310, the shared resource manager compares the amount of requested capacity to the limits of the corresponding reservation zone for the requesting entity. In particular, the shared resource manager determines whether the amount of requested capacity is within the corresponding reservation zone such that the amount of requested capacity is less than, or in some implementations equal to, an amount of the unused capacity of the shared resource that is designated by the reservation zone. The shared resource manager can optionally also compare the amount of the requested capacity to one or more other applicable capacity limits, such as a limit self-imposed by the requesting entity that may be less than the limit of the corresponding reservation zone.

If the amount of the requested capacity is within the limits of the corresponding reservation zone for the requesting entity, then the shared resource manager can grant the request (stage 312). If the entity requested capacity immediately, the resource manager can proceed to allocate the capacity without intentional delay and the shared resource executes the requested activity (stage 318). If the activity request was to make an advance reservation for capacity at a future time, then the resource manager can schedule to allocate the requested capacity at the future time (stage 316). When that time arrives, the resource manager allocates the requested capacity and the shared resource executes the prerequested activity. However, if the amount of the requested capacity is outside of the limits of the corresponding reservation zone for the requesting entity, then the shared resource manager can deny the request and block allocation of capacity for the requested activity (stage 314).

Figure 4:
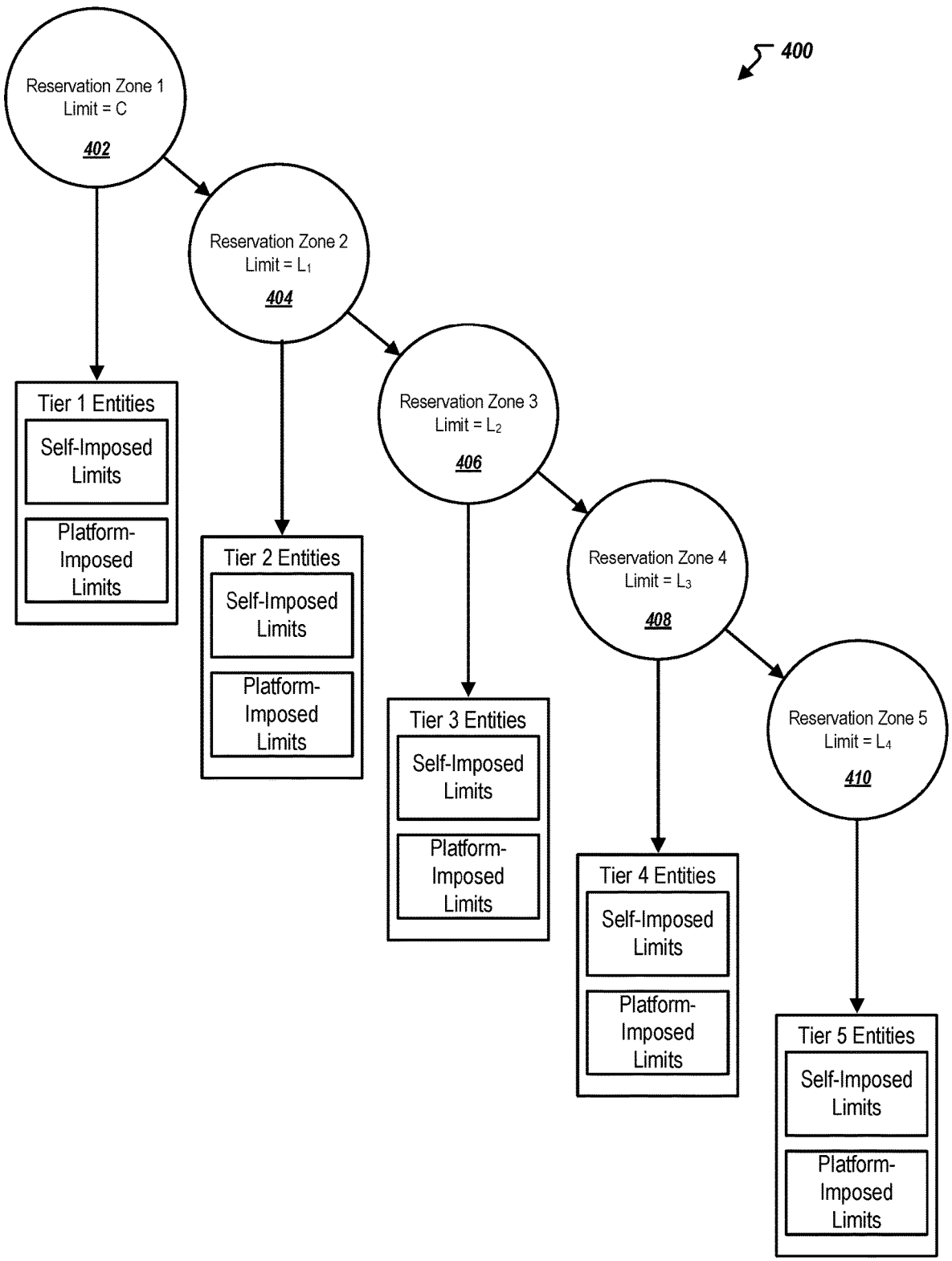
FIG. 4 depicts a conceptual diagram of a set of reservation zones that each have associated platform-imposed capacity limits and optional platform-imposed limits beyond the reservation zone limits.

FIG. 4 is a conceptual depiction of a set of reservation zones 402-410 that each have associated platform-imposed capacity limits and, optionally, additional capacity limits within the platform-imposed limits. As described with respect to FIGS. 1-3, a capacity management system can define reservation zones and dynamically adjust its limits to optimize utilization of a shared computing resource. In some implementations, the system permits an entity within a given priority tier to reserve capacity up to the full amount of reservable capacity allocated to the entire tier to which the entity belongs. For instance, in the example shown in FIG. 1, a tier 1 entity could reserve capacity for an activity that would consume the full amount of unused capacity of the resource, but such a request would potentially leave no available capacity for future requests from other entities while the first entity's activity is ongoing. Moreover, the execution of the request could exceed an amount of capacity that the entity budgeted for activities on the shared resource. Accordingly, in some implementations, an administrator of the shared resource (e.g., a cloud platform operator), the online entities themselves, or both, may impose additional limits that would prevent excessive use of the resource's capacity even if such use would otherwise be permitted within the limits of the resource's reservation zones. Thus, under each reservation zone 402-410 represented in FIG. 4, are self-imposed capacity limits and platform-imposed capacity limits (e.g., quotas) for the entities in the corresponding tiers for each zone.

A shared resource manager can check all applicable limits before determining whether to grant or deny an activity request. For example, an entity may self-impose an activity-specific capacity limit and a total capacity limit that restricts the amount of capacity the entity may consume across all activities over a period of time. The shared resource manager can verify that the amount of capacity requested is within all applicable limits including the individual activity-specific limit, the self-imposed total capacity limit, and the limits of the reservation zone for the corresponding priority tier of the requesting entity. Only if the request satisfies all applicable limits does the shared resource manager grant capacity for the request. In some implementations, the administrator of the shared resource can also impose additional limits, such as limits that restrict the share of capacity in a reservation zone that an individual entity can reserve or that can be reserved for an individual activity. For example, the platform may restrict any entity from using more than 90-percent of the capacity in the corresponding reservation zone for the entity. Amounts greater or less than 90-percent may also be assigned as appropriate.

Figure 5:
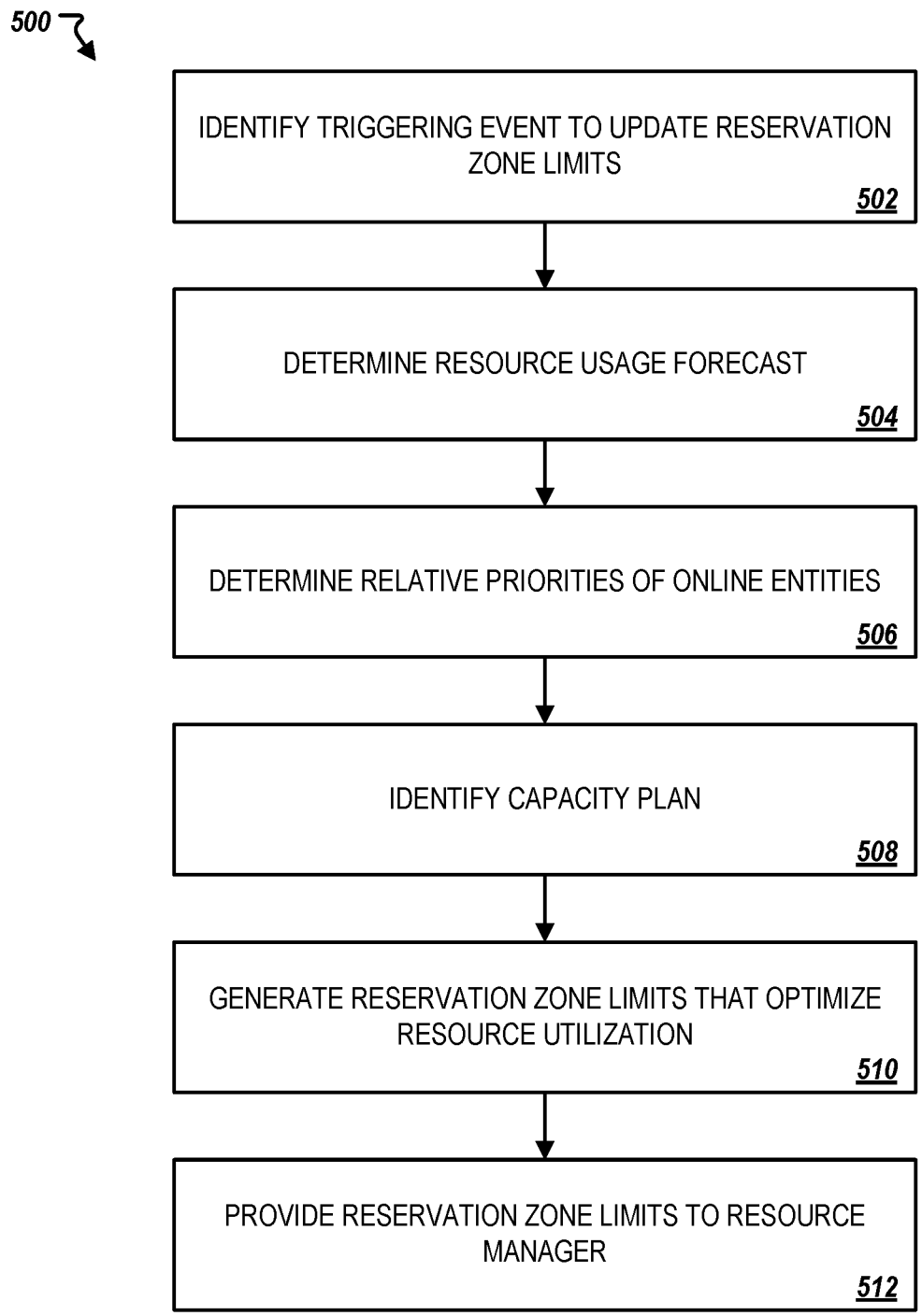
FIG. 5 depicts a flowchart of an example process for generating optimized limits for a set of reservation zones.

FIG. 5 is a flowchart of an example process 500 for generating optimized limits for a set of reservation zones. The process 500 can be performed by a capacity management system, such as the system 100 or 200 of FIGS. 1 and 2, respectively.

At stage 502, the system identifies a triggering event to update the limits of a set of reservation zones. In some implementations, the triggering event is expiration of a timer that is set to cause the system to update the limits of the reservation zones on a periodic basis. In some implementations, the triggering event is based on detection of predefined events related to received activity requests and actual usage of the shared computing resource. For example, if a difference between an amount of requested capacity received during a period of time exceeds or falls short of an amount of forecasted capacity for that period of time by a threshold amount, the system may adjust the limits of the reservation zones to account for the difference in expected and actual conditions. In some implementations, new limits can be generated in response to each received activity request.

At stage 504, the system determines a resource usage forecast. In some implementations, this stage is carried out by a shared resource usage forecasting engine, e.g., forecasting engine 204. The forecasting engine analyzes existing reservations on the shared resource and usage history data to project how much capacity of the resource each entity in a set of entities, or each group of entities in a set of groups, are likely to use and/or request during a future period of time. In some implementations, the forecasting engine determines probability density functions for each entity or group of entities indicating a relative likelihood that the entity or group of entities will use or request various levels of capacity over a range of capacities covered by the probability density function.

At stage 508, the system identifies an applicable capacity plan. The capacity plan indicates the total capacity of the shared resource that is designated to be accessible for use by the online entities.

At stage 510, the system generates reservation zone limits for the reservation zones. In some implementations, this stage is carried out by a zone limits optimization engine, e.g., optimization engine 206. The optimization engine analyzes the usage forecasts from the forecasting engine, the identified capacity plan, and data indicating the relative priorities of online entities registered with the system to determine reservation zone limits that are estimated to optimize utilization of the shared resource. The zone limits can then be provided to a shared resource manager, e.g., shared resource manager 208 which enforces the zone limits and acts on activity requests to determine whether capacity should be allocated to the entities that issued the requests.

In some implementations, the techniques described herein can be extended to allow online entities (e.g., tenants of a cloud platform) to reserve additional capacity of a shared resource than would otherwise be permitted by limits of their corresponding reservation zone. If the entity's activity request would otherwise be denied for surpassing reservation zone limits, the entity can be given the chance to have the request the granted by paying a dynamically determined supplement that would improve the value of their use of the resource beyond a threshold (e.g., so as to effectively "promote" the entity to a higher priority tier). Similarly, the system could implement a capacity auction in which an entity would submit a bid along with an activity request. The system would then be configured to approve or reject a request based on an overall evaluation of the entity's priority and the bid.

In some implementations, the capacity management system can be configured to order additional capacity for a shared resource if the system detects that demand for the resource is growing. For example, if the forecasted usage of a shared resource consistently exceeds the total available capacity of the resource over a period of time, the system may automatically bring online additional capacity, place an order for additional capacity, and/or alert an administrator that the system would benefit from additional capacity.

Figure 6:
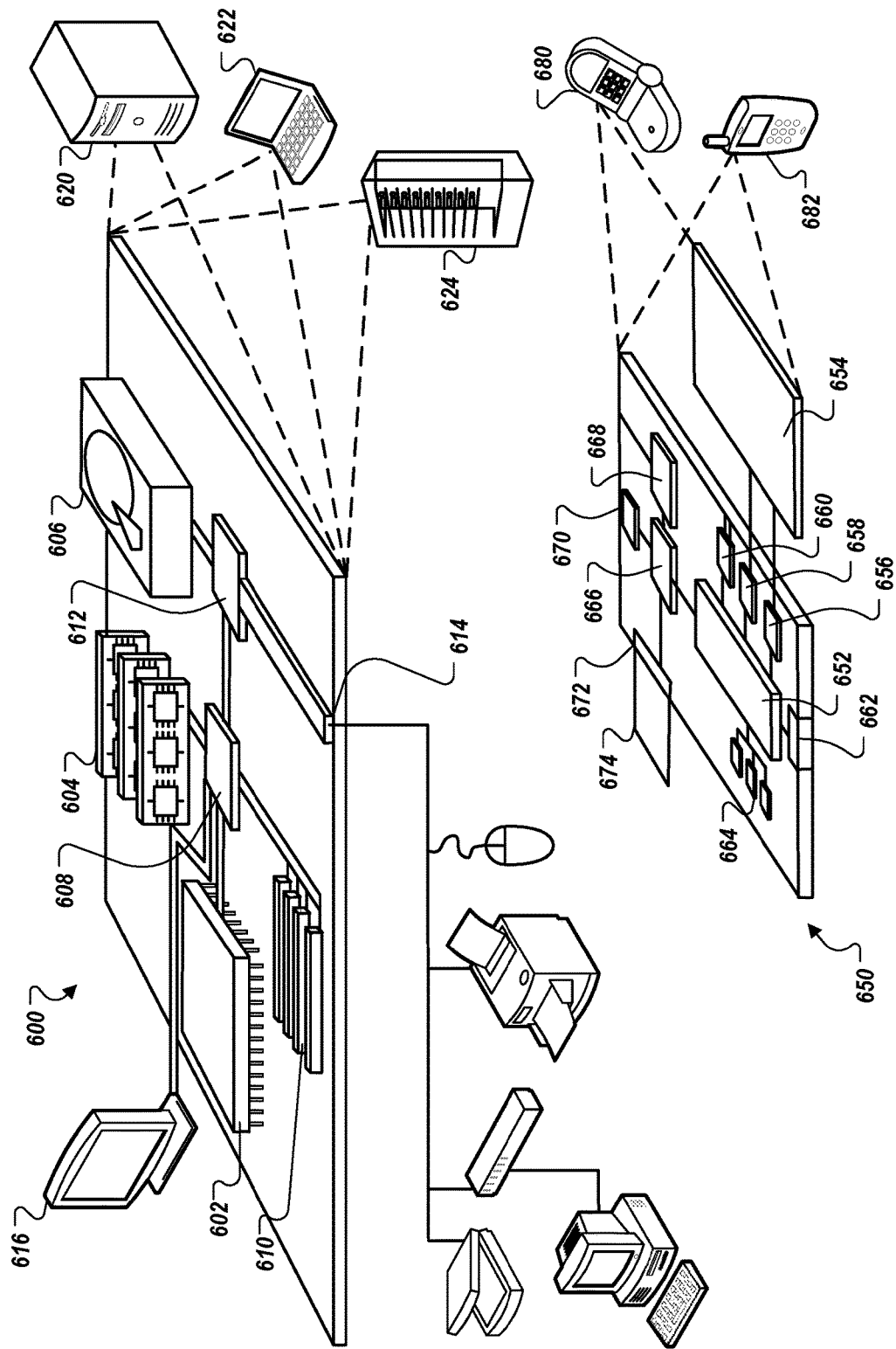
FIG. 6 depicts an example of a computing device and a mobile computing device that can be used to implement particular techniques described herein.

FIG. 6 shows an example of a computing device 600 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computing system comprising:
one or more computers having memory and at least one data processing apparatus configured to implement:
a computing resource that is shared among a plurality of online entities, the computing resource having a maximum capacity for executing activities among the plurality of online entities;
an online entity manager that assigns a priority score to each online entity of the plurality of online entities based on prioritization criteria and classifies each online entity of the plurality of online entities into a plurality of groups of online entities based on the respective priority score, wherein each group of online entities is attributed a relative priority;
an optimization engine that identifies a corresponding reservation zone from a plurality of reservation zones for each of the plurality of online entities, each reservation zone of the plurality of reservation zones designating a portion of unused capacity of the computing resource that each group of online entities of the plurality of groups of online entities are permitted to reserve, wherein each reservation zone corresponds to a relative priority and at least a sub-portion of each respective portion of the unused capacity is designated to two or more reservation zones of the plurality of reservation zones, and wherein for each respective boundary between each reservation zone, the respective boundary is set between a reservation zone corresponding to a higher relative priority and a reservation zone corresponding to a lower relative priority and the respective boundary is set at point in which an expected usage of the computing resource by a group of online entities of the higher relative priority is equal to an expected usage of the computing resource by a group of online entities of the lower relative priority; and
a resource manager that manages allocation of the maximum capacity of the computing resource to the plurality of online entities, wherein managing the allocation of the maximum capacity comprises:
receiving, by the resource manager, an activity request from one of the plurality of online entities requesting to execute an activity on the computing resource;
determining, by the resource manager, a requested amount of capacity of the computing resource required to execute the activity; and determining, by the resource manager that the requested amount of capacity of the computing resource required to execute the activity on the computing resource is more than the respective portion of unused capacity of the computing resource that is designated by the corresponding reservation zone for the one of the plurality of online entities, wherein, the resource manager, in response to determining that the requested amount of capacity of the computing resource required to execute the activity on the computing resource is more than the respective portion of unused capacity of the computing resource that is designated by the corresponding reservation zone, adjusts, for each respective reservation zone of the plurality of reservation zones, the respective portion of unused capacity of the computing resource designated to the respective reservation zone to optimize use of the unused capacity of the computing resource, wherein adjusting the respective portion of unused capacity of the computing resource designated to the corresponding reservation zone for the one of the plurality of online entities comprises increasing the respective portion of unused capacity of the computing resource designated to the corresponding reservation zone for the one of the plurality of online entities, and wherein, the resource manager, in response to adjusting the respective portions of unused capacity of the computing resource designated to each respective reservation zone, reserves the requested amount of capacity of the computing resource for the one of the plurality of online entities and executes the activity on the computing resource.

2. The computing system of claim 1, wherein the computing resource that is shared among the plurality of online entities comprises at least one of a shared network resource, a shared server resource, a shared storage resource, a shared application resource, or a shared service resource in a cloud-based platform.

3. The computing system of claim 1,
wherein the priority score assigned to each online entity of the plurality of online entities represents a measure of significance of the respective online entity; and
wherein the relative priority represents a measure of significance of the respective group of online entities.

4. The computing system of claim 3, wherein the optimization engine identifies reservation zones for each of the groups of online entities, and the identified reservation zone for each group of online entities, other than a group of online entities that is attributed a lowest relative priority, designates a respective portion of unused capacity of the computing resource that the respective group of online entities is permitted to reserve as including (i) all portions of unused capacity of the computing resource that groups of online entities that have a lower priority than the respective group of online entities are permitted to reserve and (ii) an additional portion of unused capacity of the computing resource.

5. The computing system of claim 3, wherein the prioritization criteria used to assign the priority score to each online entity includes at least one of a status of an account of the respective online entity, a historic frequency of use of the computing resource or other shared computing resources by the respective online entity, a forecasted frequency of use of the computing resource or other shared computing resources by the respective online entity, a historic level of use of the computing resource or other shared computing resources by the respective online entity, a forecasted level of use of the computing resource or other shared computing resources by the respective online entity, or types of activities initiated by the respective online entity on the computing resource or other shared computing resources.

6. The computing system of claim 1, wherein the optimization engine is further configured to determine zone limits that define boundaries between each reservation zone in the plurality of reservation zones based on (i) forecasted levels of use of the computing resource by online entities in the plurality of online entities and (ii) each priority of the plurality of online entities.

7. The computing system of claim 1, wherein the resource manager is configured, in response to determining that the requested amount of capacity of the computing resource required to execute the activity on the computing resource is less than the respective portion of unused capacity of the computing resource that is designated by the corresponding reservation zone for the one of the plurality of online entities, to allocate the requested amount of capacity of the computing resource for use by the one of the plurality of online entities without intentional delay or making an advance reservation for the requested amount of capacity of the computing resource that is to be allocated for use by the one of the plurality of online entities at a future time.

8. A computer-implemented method comprising:
receiving, by a computing system that manages a computing resource shared by a plurality of online entities, an activity request from a first online entity of the plurality of online entities requesting to execute an activity on the computing resource, each online entity of the plurality of online entities having a priority score assigned based on a prioritization criteria and classified into a group of online entities of a plurality of groups of online entities based on the respective priority score, wherein each group of online entities is attributed a relative priority;

determining, by the computing system, a requested amount of capacity of the computing resource required to execute the activity on the computing resource;

determining, by the computing system, a priority of the first online entity with respect to priorities of other ones of the plurality of online entities;

identifying, by the computing system, a reservation zone from a plurality of reservation zones that corresponds to the determined priority of the first online entity, each reservation zone of the plurality of reservation zones designating a portion of unused capacity of the computing resource that each group of online entities of the plurality of groups of online entities are permitted to reserve, wherein each reservation zone corresponds to a relative priority and at least a sub-portion of each respective portion of the unused capacity is designated to two or more reservation zones of the plurality of reservation zones, and wherein for each respective boundary between each reservation zone, the respective boundary is set between a reservation zone corresponding to a higher relative priority and a reservation zone corresponding to a lower relative priority and the respective boundary is set at point in which an expected usage of the computing resource by a group of online entities of the higher relative priority is equal to an expected usage of the computing resource by a group of online entities of the lower relative priority;

determining, by the computing system, that the requested amount of capacity of the computing resource required to execute the activity on the computing resource is more than the respective portion of unused capacity of the computing resource designated by the identified reservation zone;

in response to determining that the requested amount of capacity of the computing resource required to execute the activity on the computing resource is more than the respective portion of unused capacity of the computing resource designated by the identified reservation zone, adjusting, by the computing system, for each respective reservation zone of the plurality of reservation zones, the respective portion of unused capacity of the computing resource designated to the respective reservation zone to optimize use of the unused capacity of the computing resource, wherein adjusting the respective portion of unused capacity of the computing resource designated to the corresponding reservation zone for the first online entity comprises increasing the respective portion of unused capacity of the computing resource designated to the corresponding reservation zone for the first online entity; and in response to adjusting the respective portions of unused capacity of the computing resource designated to each respective reservation zone, reserving, by the computing system, the requested amount of capacity of the computing resource for the first online entity and executing the activity on the computing resource.

9. The computer-implemented method of claim 8, wherein the computing resource that is shared by the plurality of online entities comprises at least one of a shared network resource, a shared server resource, a shared storage resource, a shared application resource, or a shared service resource in a cloud-based platform.

10. The computer-implemented method of claim 8,
wherein the priority score assigned to each online entity of the plurality of online entities represents a measure of significance of the respective online entity; and
wherein the relative priority represents a measure of significance of the respective group of online entities.

11. The computer-implemented method of claim 10, further comprising determining, by the computing system, the priority score for each of the plurality of online entities based on at least one of a status of an account of the respective online entity, a historic frequency of use of the computing resource or other shared computing resources by the respective online entity, a forecasted frequency of use of the computing resource or other shared computing resources by the respective online entity, a historic level of use of the computing resource or other shared computing resources by the respective online entity, a forecasted level of use of the computing resource or other shared computing resources by the respective online entity, or types of activities initiated by the respective online entity on the computing resource or other shared computing resources.

12. The computer-implemented method of claim 8, wherein the respective portion of unused capacity of the computing resource that the identified reservation zone designates as being permissible for online entities having a relative priority of the first online entity to reserve includes (i) all portions of unused capacity of the computing resource that online entities having relative priorities below the relative priority of the first online entity are permitted to reserve and (ii) an additional portion of unused capacity of the computing resource.

13. The computer-implemented method of claim 8, further comprising determining, by the computing system, limits for each reservation zone of the plurality of reservation zones based on (i) forecasted levels of use of the computing resource by online entities in the plurality of online entities and (ii) the priorities of the other ones of the plurality of online entities.

14. The computer-implemented method of claim 8, wherein reserving the requested amount of capacity of the computing resource for the first online entity to execute the activity on the computing resource comprises making an advance reservation for the requested amount of capacity of the computing resource that is to be allocated for use by the first online entity at a future time.

15. A computing system for managing a computing resource shared by a plurality of online entities, comprising:
one or more processors; and
one or more computer-readable media having instructions stored thereon that, when executed by the one or more processors, cause the one or more processors to perform operations comprising:
receiving, at the one or more processors, an activity request from a first online entity of the plurality of online entities requesting to execute an activity on the computing resource, each online entity of the plurality of online entities having a priority score assigned based on a prioritization criteria and classified into a group of online entities of a plurality of groups of online entities based on the respective priority score, wherein each group of online entities is attributed a relative priority;
determining, by the one or more processors, a requested amount of capacity of the computing resource required to execute the activity on the computing resource;
determining, by the one or more processors, a priority of the first online entity with respect to priorities of other ones of the plurality of online entities;
identifying, by the computing system, a reservation zone from a plurality of reservation zones that corresponds to the determined priority of the first online entity, each reservation zone of the plurality of reservation zones designating a portion of unused capacity of the computing resource that each group of online entities of the plurality of groups of online entities are permitted to reserve, wherein each reservation zone corresponds to a relative priority and at least a sub-portion of each respective portion of the unused capacity is designated to two or more reservation zones of the plurality of reservation zones, and wherein for each respective boundary between each reservation zone, the respective boundary is set between a reservation zone corresponding to a higher relative priority and a reservation zone corresponding to a lower relative priority and the respective boundary is set at point in which an expected usage of the computing resource by a group of online entities of the higher relative priority is equal to an expected usage of the computing resource by a group of online entities of the lower relative priority;
determining, by the one or more processors, that the requested amount of capacity of the computing resource required to execute the activity on the computing resource is more than the respective portion of unused capacity of the computing resource designated by the identified reservation zone;
in response to determining that the requested amount of capacity of the computing resource required to execute the activity on the computing resource is more than the respective portion of unused capacity of the computing resource designated by the identified reservation zone, adjusting, by the computing system, for each respective reservation zone of the plurality of reservation zones, the respective portion of unused capacity of the computing resource designated to the respective reservation zone to optimize use of the unused capacity of the computing resource, wherein adjusting the respective portion of unused capacity of the computing resource designated to the corresponding reservation zone for the first online entity comprises increasing the respective portion of unused capacity of the computing resource designated to the corresponding reservation zone for the first online entity; and in response to adjusting the respective portions of unused capacity of the computing resource designated to each respective reservation zone, reserving, by the computing system, the requested amount of capacity of the computing resource for the first online entity and executing the activity on the computing resource.

16. The computing system of claim 15, wherein the computing resource that is shared by the plurality of online entities comprises at least one of a shared network resource, a shared server resource, a shared storage resource, a shared application resource, or a shared service resource in a cloud-based platform.

17. The computing system of claim 15,
wherein the priority score assigned to each online entity of the plurality of online entities represents a measure of significance of the respective online entity; and
wherein the relative priority represents a measure of significance of the respective group of online entities.

18. The computing system of claim 17, wherein the operations further comprise determining, by the one or more processors, the priority score for each of the plurality of online entities based on at least one of a status of an account of the respective online entity, a historic frequency of use of the computing resource or other shared computing resources by the respective online entity, a forecasted frequency of use of the computing resource or other shared computing resources by the respective online entity, a historic level of use of the computing resource or other shared computing resources by the respective online entity, a forecasted level of use of the computing resource or other shared computing resources by the respective online entity, or types of activities initiated by the respective online entity on the computing resource or other shared computing resources.

19. The computing system of claim 15, wherein the respective portion of unused capacity of the computing resource that the identified reservation zone designates as being permissible for online entities having a relative priority of the first online entity to reserve includes (i) all portions of unused capacity of the computing resource that online entities having relative priorities below the relative priority of the first online entity are permitted to reserve and (ii) an additional portion of unused capacity of the computing resource.

20. The computing system of claim 15, wherein reserving the requested amount of capacity of the computing resource for the first online entity to execute the activity on the computing resource comprises making an advance reservation for the requested amount of capacity of the computing resource that is to be allocated for use by the first online entity at a future time.

* * * * *